Patented Aug. 27, 1940

2,212,924

UNITED STATES PATENT OFFICE 2,212,924

PRODUCTION OF PHTHALOCYANINE PIGMENTS

Fritz Muehlbauer, Ludwigshafen-on-the-Rhine, Germany, assignor to General Aniline & Film Corporation, a corporation of Delaware No Drawing. Application April 18, 1936, Serial No. 75,225. In Germany April 20, 1935

10 Claims. (Cl. 260—314)

The present invention relates to the production of pigment dyestuffs from derivatives of aromatic ortho dicarboxylic acids.

I have found that very valuable pigment dyestuffs can be obtained in excellent yields by heating derivatives of aromatic ortho-dicarboxylic acids which are formed by the combination of nitrogen to the carbon atoms of the two adjacent carboxylic groups, or their substitution products, as for example phthalodinitrile, ortho-cyanobenzamide or naphthalene ortho-dicarboxylic dinitriles, with amides. It is also possible to carry out this process in the presence of substances supplying metal, such as metals or metal compounds, dyestuffs being obtained which generally contain the said metal in complex combination. In this manner even such metals and metal compounds or mixtures of the same as otherwise only react with difficulty or with unsatisfactory yields with the ortho-dinitriles and the like, enter very readily into reaction and excellent yields are obtained.

As especially suitable amides may be mentioned for example formamide, acetamide, propionic amide, acid amides of higher fatty acids, adipic acid amide, toluene sulphamides and benzamide. The amides may be employed as such or in admixture with each other or together with other substances, as for example diluents and the like, such as nitrobenzene, orthodichlorbenzene, phthalic acid esters or benzophenone. The reaction temperature usually lies above 130° C. Any desired pressure may be employed.

The process may be carried out for example by mixing an ortho-dinitrile with a metal component, adding an amide and then heating the mixture. Usually the dyestuff separates even after a short time in a beautifully crystallized form and of practically analytical purity. It is especially suitable to use metals in the form of powder or as chips, and also oxides, carbonates, basic carbonates, acetates or complex compounds of the metals, as for example complex ammonia compounds.

The dyestuffs obtainable from phthalodinitrile according to the said process may be crystallized if desired in the form of needles which are green in transmitted light and have a beautiful bronze lustre in reflected light. They are practically insoluble in the usual organic solvents, but readily soluble in concentrated sulphuric acid, fuming sulphuric acid, thionyl chloride, mixtures of chlorosulphonic acid with thionyl chloride or sulphuryl chloride, alkylsulphonic acids, dimethyl sulphate and phosphorus oxychloride. They may be employed for example as pigment dyestuffs for a great variety of purposes.

The following examples will further illustrate how the said invention may be carried out in practice but the invention is not restricted to these examples. The parts are by weight.

Example 1

20 parts of phthalodinitrile, 19 parts of formamide and 50 parts of benzophenone are heated to boiling for 4½ hours. The reaction product is diluted with nitrobenzene, boiled for a short time, filtered by suction while hot and washed with acetone. After drying, the dyestuff is dissolved in concentrated sulphuric acid, separated in a pure form by the addition of ice, washed free from acid and converted into a suitable form, as for example paste or powder, if desired after the addition of dispersing agents.

Example 2

50 parts of phthalodinitrile, 62 parts of acetamide and 85 parts of formamide are heated for 2 hours under reflux. The dyestuff is worked up as described in Example 1.

Instead of phthalodinitrile, a corresponding amount of a naphthalene-ortho-dicarboxylic acid dinitrile may be employed.

Example 3

20 parts of phthalodinitrile and 25 parts of acetamide are heated for 8 hours at 220° C. The dyestuff is worked up as described in Example 1.

Example 4

20 parts of phthalodinitrile and 65 parts of formamide are heated to boiling for half an hour. The dyestuff is worked up as described in Example 1.

Example 5

65 parts of 4-chlorphthalodinitrile are heated at from 190° to 195° C. for about 1 hour with 300 parts of formamide. The dyestuff separates in the form of fine crystals and is isolated as described in Example 1. In order to convert the dyestuff into a state of fine dispersion it is preferable to dissolve it in chlorsulphonic acid and to pour the solution carefully onto ice.

Example 6

1000 parts of phthalodinitrile are dissolved in 600 parts of dimethylaniline. 950 parts of formamide are run in at about 160° C. and the mixture is heated at 180° C. for 15 hours. The metal-free dyestuff separates in the form of well-shaped needles. They are filtered off by suction and preferably again boiled in nitrobenzene, the latter being washed out with alcohol or acetone. The product obtained is in a state of analytical purity.

Example 7

20 parts of phthalodinitrile and 65 parts of formamide are heated at between 195° and 200° C. for from 30 to 60 minutes in a closed vessel. By boiling with nitrobenzene and subsequently washing with alcohol or acetone the dyestuff is obtained in a pure state.

The same dyestuff is obtained by heating 20 parts of phthalonitrile with 65 parts of formamide in an autoclave at 150° C. for about 3 hours and simultaneously pressing in ammonia or a neutral gas, as for example nitrogen. The reaction mixture is worked up in the usual manner.

Example 8

2 parts of cuprous chloride are dissolved in 12.5 parts of formamide at about 100° C. while adding 1.6 parts of pyridine. 5 parts of phthalodinitrile or 6.5 parts of 4-chlorphthalodinitrile are then added and heating is continued. Reaction commences at 150° C., the temperature rising rapidly and the whole reaction mixture becoming solid. The latter is then diluted with formamide, and the dyestuff is filtered off by suction, boiled first with alcohol and then with dilute hydrochloric acid, well washed and dried. It is converted into a finely dispersed form by redissolution from concentrated sulphuric acid or after grinding in admixture with common salt and subsequently separating it therefrom by washing out the common salt.

Example 9

50 parts of phthalodinitrile are dissolved in 250 parts of formamide at between about 80° and 90° C., and then 25 parts of cobalt carbonate (or 25 parts of nickel carbonate) are added to the solution. The formation of the dyestuff sets in at 170° C., the temperature rising up to 185° C. The reaction mixture solidifies to form a thick pulp which is diluted with about 75 parts of formamide and again heated for some time. The mixture is worked up in the usual manner.

Example 10

A mixture of 100 parts of phthalodinitrile, 500 parts of formamide and 125 parts of ferric oxide is heated to boiling while stirring. After about 15 minutes the dyestuff is formed. The mixture is then diluted with an equal amount of formamide and subsequently heated for some time. The dyestuff is then filtered by suction while hot, subsequently washed with formamide and water and subsequently boiled with dilute hydrochloric acid until an excess of iron is no longer detectable. Then it is washed until neutral, a small portion of the dyestuff being colloidally dissolved giving an intense blue coloration. The dyestuff obtained in a good yield is an almost black powder which crystallizes in the form of small needles and dissolves in amines giving a brilliant green color.

Example 11

10 parts of phthalodinitrile are dissolved in 50 parts of formamide. 3 parts of calcium oxide are stirred into the solution at about 100° C. and the whole is heated to about 180° C. The dyestuff which contains calcium separates as a finely crystalline powder having a bronze-like sheen. The dyestuff is isolated and worked up as in the preceding examples.

Example 12

130 parts of 4-chlorphthalodinitrile are dissolved at about 100° C. in 600 parts by volume of formamide. 15 parts of zinc dust are then introduced into the solution and the whole is heated to 150° C. When the formation of dyestuff is complete heating is continued for about 15 minutes, then the dyestuff is filtered off by suction and subsequently rinsed with about 500 parts by volume of formamide. It is then boiled with dilute hydrochloric acid and thoroughly washed. The yield of dyestuff amounts to 100 parts.

Other halogen-substituted dinitriles react in an analogous manner. Other metal compounds may as well be employed.

Example 13

45 parts of phthalodinitrile, 350 parts of formamide and 6 parts of zinc dust are heated at between 140° and 150° C. in a stirring autoclave for 1 hour, ammonia or nitrogen being at the same time pressed in. The dyestuff obtained by the said manner corresponds to that described in Example 4.

Example 14

50 parts of phthalodinitrile are fused together with 150 parts of ortho-toluene sulphamide (or with an equal amount of para-toluene sulphamide). 7.5 parts of zinc dust (or 15 parts of cuprous oxide or 25 parts of nickel carbonate or 25 parts of cobalt carbonate) are introduced into the melt at 150° C. while stirring. At 170° C. the reaction mixture assumes a green coloration; the dyestuff forms at about 190° C, the temperature rising up to 215° C. Heating is continued for a short time, the mixture is diluted, and then the dyestuff is boiled with alcohol and filtered off by suction. It is thus obtained in a good yield in the form of fine crystals.

Example 15

50 parts of phthalodinitrile (or 65 parts of 4-chlorphthalodinitrile), 150 parts of urea and 20 parts of cuprous chloride are intimately mixed. The mixture is fused at about 120° C. while well stirring and further heated at the same temperature. The formation of dyestuff sets in at 145° C., whereby the temperature rises to 200° C. and the melt solidifies. The crude product is pulverized, boiled with dilute hydrochloric acid, well washed and after drying brought into a state of fine dispersion in known manner. The yield is nearly quantitative.

Example 16

10 parts of phthalodinitrile are dissolved in 50 parts of formamide. An alcoholate of one of the alkali metals, as for example sodium alcoholate, is then added to the mixture in such an amount that the molecular ratio of phthalodinitrile to alkali metal is 4:2. After boiling for about 30 minutes, the pigment dyestuff separates in crystalline form. The purification is effected by thorough washing with organic solvents, subsequent boiling in dilute hydrochloric acid and good washing with water. The pigment dyestuff is obtained in a finely divided form by precipitation from concentrated sulphuric acid.

Oxides, carbonates or cyanides of the alkalies may be employed instead of the alcoholate.

Example 17

52 parts of phthalodinitrile and 5 parts of beryllium oxide are heated to boiling for two hours with 100 parts of formamide. The deposited pigment dyestuff is washed with organic solvents, boiled with dilute hydrochloric acid, washed and dried. It is obtained in the form of small blue needles having a greenish blue tinge.

*Example 18*

50 parts of phthalodinitrile are mixed with 4 parts of magnesium oxide and heated for about 15 minutes at from 180° to 190° C. with 200 parts of formamide. The reaction sets in very vigorously at about 145° to 150° C. with strong foaming. At this moment it is preferable to add further amounts of formamide and then to keep the temperature at from 160° to 170° C. for from 2 to 3 hours.

The purification of the pigment dyestuff is effected in the usual manner. The blue-green pigment dyestuff readily adds on to bases, such as aniline, pyridine, benzylamine, and ethanolamine, whereby the shade of color changes into a pure green-blue.

If the formamide be replaced by another amide, as for example acetamide or a toluene sulphamide, and the magnesium oxide be replaced by aluminium chloride or aluminium acetate, a still more greenish colored blue pigment is obtained.

*Example 19*

450 parts of phthalodinitrile or an equimolecular amount of a substituted aromatic ortho-dinitrile are dissolved in 2500 parts of formamide. 60 parts of zinc dust are stirred into the solution and the latter is heated. The reaction commences at about 150° C. with vigorous foaming; the temperature is thus increased to about 200° C. The pigment dyestuff separates in the form of small needles having a bronze lustre. It is practically insoluble in the usual non-basic organic solvents but dissolves in bases, such as aniline, pyridine, quinoline, piperidine, cyclohexylamine, benzylamine or ethanolamines, and crystallizes while adding on to the said bases in well-formed crystals having a bronze lustre with a pure blue tinge.

Corresponding amounts of zinc oxide, zinc acetate or zinc chloride may be used instead of zinc dust in the said process.

*Example 20*

105 parts of phthalodinitrile are dissolved in 250 parts of nitrobenzene. A solution of 45 parts of zinc acetate in 150 parts of formamide is added at about 100° C. and the whole heated for about three hours at the boiling temperature while stirring. The reaction proceeds comparatively quietly. The pigment dyestuff is obtained in a state of analytical purity by washing with alcohol or acetone, boiling with dilute hydrochloric acid and repeated washing.

*Example 21*

25 parts of phthalodinitrile are mixed well with 7 parts of cadmium oxide and heated at from 180° to 190° C. with 100 parts of formamide. The formation of dyestuff takes place at from 150° to 160° C. with considerable increase in temperature, whereby the reaction mixture solidifies to a pulp. The whole is diluted with formamide, heated for about an hour to boiling and the cadmium compound is obtained in the form of fine green needles having a red surface lustre. By washing with formamide, boiling with dilute hydrochloric acid and repeated washing with water and organic solvents, the dyestuff is obtained in a state of analytical purity. It is practically insoluble in the usual organic solvents. By dissolution in concentrated sulphuric acid, the green-blue dyestuff loses its metal and is converted into the blue phthalocyanine free from metal.

*Example 22*

52 parts of phthalodinitrile and 46 parts of ferrous chloride (containing water of crystallization) are heated together with 300 parts of acetamide. The formation of the pigment dyestuff takes place at from 180° to 190° C. Practically the same product is obtained by employing anhydrous ferric chloride or by heating 52 parts of phthalodinitrile and 16 parts of ferric oxide together with from 150 to 200 parts of formamide.

The iron compound which is dirty blue green in a coating yields beautiful green shades of color with bases, such as aniline, pyridine, piperidine and benzylamine.

Compounds of other metals of the iron group may be employed instead of the iron compounds.

*Example 23*

25 parts of phthalodinitrile and 16 parts of sublimed chromic chloride (or 12 parts of anhydrous chromous chloride) are heated for about half an hour to boiling with 450 parts of formamide. The pigment dyestuff separates as a heavy, black-blue, crystalline powder. It gives dirty green coatings similar to those obtained with the corresponding iron compound. By precipitation from concentrated sulphuric acid, it is obtained in a finely divided form. It is practically insoluble in non-basic organic solvents but soluble to give a deep green coloration in bases, such as aniline, dimethylaniline, pyridine, piperidine, quinoline, cyclohexylamine, ethanolamine and hydrazine. The pigment dyestuff crystallizes from the solutions in the form of the addition compound with the base concerned. It also forms addition compounds with basic dyestuffs, as for example auramine and methylene blue.

*Example 24*

A green dyestuff is obtained by heating 50 parts of phthalodinitrile and 22 parts of lead oxide together with 200 parts of formamide for from about a quarter to half an hour at 190° C. By dissolution in concentrated sulphuric acid the green pigment dyestuff containing lead is converted into the blue pigment dyestuff free from metal. By treatment with acid chlorides, such as benzyl chloride, the shade of color changes from green to blue.

*Example 25*

50 parts of phthalodinitrile, 18 parts of vanadium pentoxide and from 150 to 200 parts of foramide (or acetamide) are heated to boiling for some time, whereby the pigment dyestuff is precipitated in the form of dark blue crystals.

*Example 26*

25 parts of phthalodinitrile are heated with 11 parts of manganese carbonate (or 9 parts of pyrolusite) and from 100 to 150 parts of formamide for about 20 minutes at 190° C. The resulting pigment dyestuff crystallizes in black-green well-formed needles having a green coloration when held up to light. The new pigment dyestuff adds on to amines with the formation of vivid blue addition products. By treatment with concentrated sulphuric acid the dyestuff loses its metal and is converted into the pigment dyestuff free from metal.

I claim:

1. A process of producing pigment dyestuffs which comprises heating a derivative of an aromatic ortho-dicarboxylic acid selected from the class consisting of dinitriles and ortho-cyanamides, with an amide, said amide being a compound different from said aromatic ortho-dicarboxylic acid derivative.

2. A process of producing pigment dyestuffs which comprises heating at above 130° C. a derivative of an aromatic ortho-dicarboxylic acid selected from the class consisting of dinitriles and ortho-cyan-amides, with an amide, said amide being a compound different from said aromatic ortho-dicarboxylic acid derivative.

3. A process of producing pigment dyestuffs which comprises heating at above 130° C. a derivative of an aromatic ortho-dicarboxylic acid selected from the class consisting of dinitriles and ortho-cyan-amides, with an amide, said amide being a compound different from said aromatic ortho-dicarboxylic acid derivative in the presence of a metalliferous reactant.

4. A process of producing pigment dyestuffs which comprises heating at above 130° C. a phthalodinitrile with an amide.

5. A process of producing pigment dyestuffs which comprises heating at above 130° C. a phthalodinitrile with an amide in the presence of a substance selected from the class consisting of free metals, metal oxides and metal salts.

6. A process of producing pigment dyestuffs which comprises heating at above 130° C. a phthalodinitrile with formamide in the presence of a substance selected from the class consisting of free metals, metal oxides and metal salts.

7. A process of producing pigment dyestuffs which comprises heating at above 130° C. a phthalodinitrile with urea in the presence of a substance selected from the class consisting of free metals, metal oxides and metal salts.

8. A process of producing pigment dyestuffs which comprises heating at above 130° C. phthalodinitrile with formamide in the presence of a substance selected from the class consisting of free copper, copper oxides and copper salts.

9. A process of producing pigment dyestuffs which comprises heating at above 130° C. phthalodinitrile with urea in the presence of a substance selected from the class consisting of free copper, copper oxides and copper salts.

10. A process of producing a phthalocyanine pigment which comprises heating ortho-cyano-benzamide and a metalliferous reactant in the presence of urea.

FRITZ MUEHLBAUER.